Oct. 20, 1936.　　J. A. H. MYERS　　2,058,172
FIELD COOKING APPARATUS
Filed Dec. 20, 1933
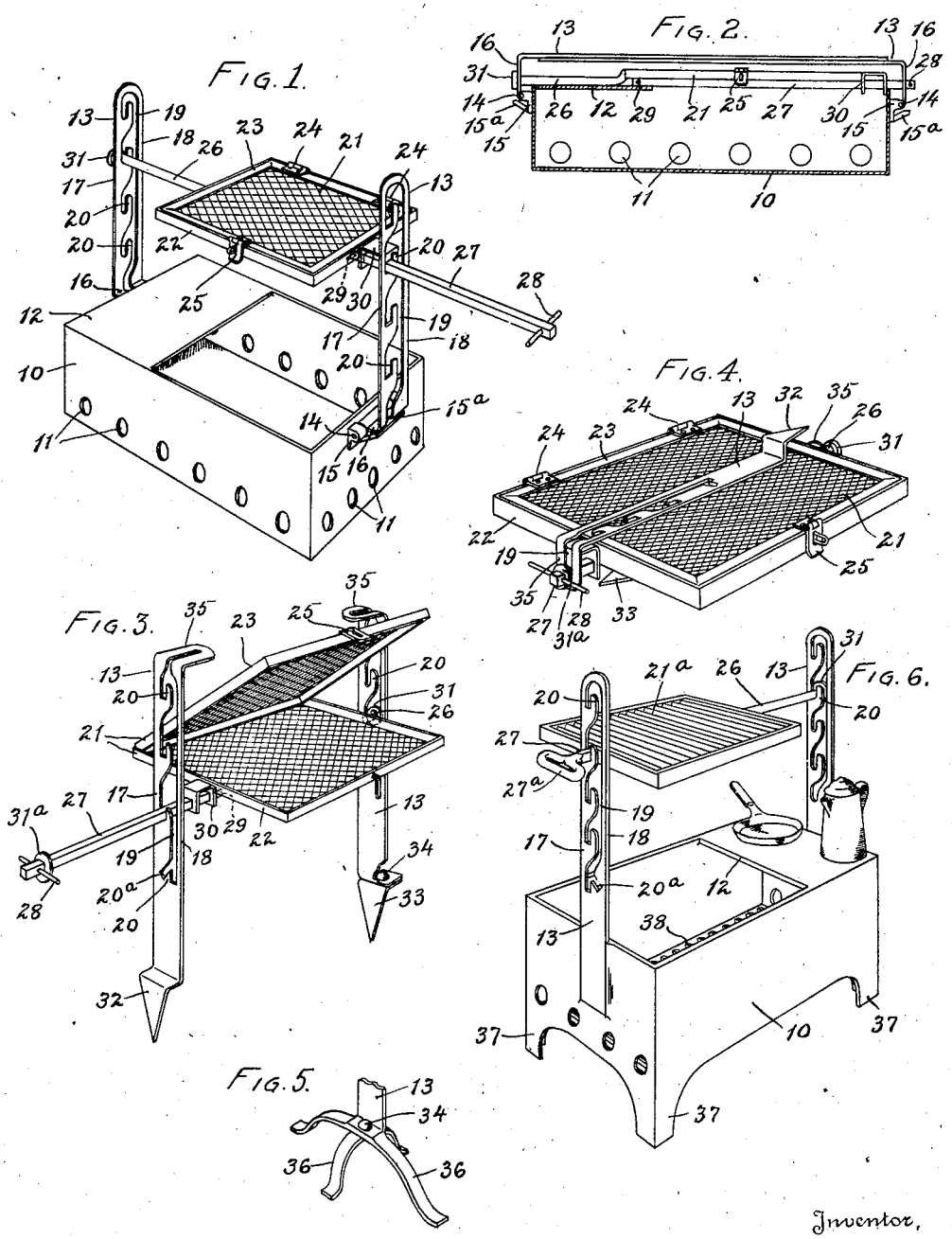
Inventor,
J. A. H. Myers.
By Robert M Pierson,
Attorney Patented Oct. 20, 1936

2,058,172

UNITED STATES PATENT OFFICE 2,058,172

FIELD COOKING APPARATUS

Joseph A. H. Myers, Akron, Ohio

Application December 20, 1933, Serial No. 703,164

4 Claims. (Cl. 126—29)

This invention relates to fire cookers, and especially field cooking apparatus of either the portable or permanent type for use by picknickers, campers, in recreation parks, etc.

Among the objects of the invention is the provision of a cooking utensil such as a broiler, permanently associated with rack members for supporting said utensil at different heights above the fire. Further objects are to provide a portable folding apparatus of this character, either including or not including a fire box; to arrange in an improved manner for the accommodation of cooking vessels and a broiler in an apparatus of the fire-box type; to facilitate the cooking of steaks in a double broiler to different degrees in different parts thereof, and to arrange for swinging a broiler aside from over a fire built upon the ground.

Of the accompanying drawing, Fig. 1 is a perspective view of a portable folding cooker of the fire-box type embodying one form of my invention and shown in extended or operative condition.

Fig. 2 is a longitudinal section of the same in collapsed or folded condition.

Figs. 3 and 4 are perspective views of another form of my invention adapted for use with a fire built upon the ground and showing said form respectively in extended and collapsed conditions.

Fig. 5 is a perspective view showing a modified supporting foot for the latter form of the invention.

Fig. 6 is a perspective view showing a third form of the invention.

Referring at first to Figs. 1 and 2, 10 is a supporting base in the form of a rectangular fire box, adapted to set with its bottom directly on the ground, for containing and burning solid fuel such as wood, coal briquettes or charcoal and having its vertical side and end walls perforated with holes 11 to provide draft openings for the fire. At one end of the box and extending for a distance of about one-third of its length is a shelf or stove top 12 for supporting vessels such as coffeepots, pans, etc. over the fire at that end, the remaining portion of the fire being exposed for broiling or grill cooking.

Upon the opposite end walls of the box 10, near the top edges thereof, are mounted a pair of grill-supporting standards 13, each of which has its lower end pivoted on a pin 14 carried by ears on a bracket 15 attached to the box wall, the hinge member of the standard 13 being formed upon a portion 16 of said standard, which is bent at right angles to the main or upright portion to allow folding over of the latter parallel with the plane of the box when the apparatus is collapsed. Each of these standards comprises a pair of bars 17, 18 integrally connected with each other at both ends and separated by a longitudinal slot 19. The bar 17 is formed with a series of upwardly-open hooks 20 located at different heights for receiving an end rod of the grill or broiler and supporting the latter at different heights above the fire, so that the standard 13 constitutes a rack with a series of alternative grill-supporting members. The bar 18 acts as a guard or retainer for the grill rod. The slot 19 is extended into the laterally-bent, hinged-end portion 16 to facilitate folding. The notches in the hooks 20 of the front-end rack 13 are rectangular or flat bottomed to prevent turning of a square-section handle stem on the grill, while those at the rear end are round bottomed to permit turning of a circular-section stem on the rear end of the grill. A stop member 15ª on each of the brackets 15 prevents over-swinging of the corresponding rack 13 in its upright position.

21 is a grill, here shown as a double broiler, with lower and upper grid sections 22, 23 spaced apart to receive one or more steaks etc. between them and connected by hinges 24 at one edge and a separable fastener or catch 25 at the opposite edge. On the rear edge of the grid section 22 is fixed a projecting stem or trunnion rod 26 adapted to be received in any one of the hooks 20 of the corresponding rack 13 and to turn therein when it is desired to reverse the broiler. The length of said rod 26 is sufficient to include the length of the fire-box shelf 12, and the length of the grill body corresponds with that of the upwardly-open portion of said fire box.

From the front edge of the grid section 22 projects a stem or handle rod 27 adapted to be received in any one of the hooks 20 of the front rack 13 and prevented from rotation when occupying the notch of said hook by reason of the complemental rectangular shape of said rod and notch. Said rod has a transverse handle-pin 28 fixed at its outer end and a transverse stop-pin 29 fixed at its inner end. The pin 28 is of too large diameter to pass through the slot 19 of the front standard 13 and therefore may act as a stop in connection with the standard, or it could, if desired, be made smaller and supplemented with a stem stop washer 31ª such as that hereinafter described in connection with Figs. 3 and 4. It is mounted in a U-shaped bracket 30 fastened to the grid section 22 and is longitudinally slidable on the grill body to extend the handle rod for use as indicated in Fig. 1, or to collapse it for folding as indicated in Fig. 2.

A stop button or flange disk 31 on the outer side of the rear bracket 13 is non-removably fastened on the trunnion stem 26 after the parts have been assembled, the diameter of said button being too great to pass through the open spaces of the rack. By this means and by reason of the relation of parts at the front end, the utensil 21 is permanently associated with the racks 13.

The fire-box 10 acts as a supporting base for holding the standards 13 in either an upright or a folded position, and said standards, together with the hinges formed by the members 14, 15, constitute a pair of supports for the grill, having slotted members 16 which are offset in the folded positions of the standards (and in this case also in the upright position) permitting the folding of the latter without disconnecting the grill.

In the use of this apparatus, the shelf 12 acts as a stove top for the heating of cooking vessels such as pots and pans which it is not desired to expose directly to the fire. Broiling, toasting and like open-fire cooking operations as well as heating in vessels may be performed upon the grill 21. The provision for raising and lowering said grill by passing the stem rods 26 and 27 along the slots 19 from one pair of hooks 20 to another and supporting them in said hooks at different distances from the fire greatly adds to the convenience of these grilling operations, while the fact that the grill is permanently associated with its racks 13 prevents the loss, theft or contamination of the separate parts. When it is desired to reverse the grill without changing its height above the fire, said grill may be tilted by lifting its squared handle rod 27 out of the corresponding hook notch, turned while its trunnion rod 26 is supported in the rear hook notch, and the handle rod 27 then lowered into the front notch to hold the grill in the reversed position.

When the apparatus is not in use, it may be collapsed by lowering the grill 21 upon the fire box 10, sliding the handle rod 27 for the greater portion of its length inwardly under the grill body to decrease the total length, and folding the racks 13 by swinging them toward each other to bring their upright portions one over the other above the depressed grill and parallel with the plane of the grill and fire box as indicated in Fig. 2, the rods 26 and 27 then occupying the extensions of the slots 19 in the bent portions 16 of the racks. In this position the horizontal racks are spaced from the grill and adapted to act as a handle whereby the apparatus may be manually transported.

Figs. 3 and 4 illustrate a simplified form of the invention, omitting the fire box and adapted for use with an open fire built upon the ground or for use over a small fireplace on the ground. In this case, standards or racks 13 similar to those previously described in having the hooked bars 17 with hooks 20 at different heights, guard bars 18 and vertical slots 19, are provided with pointed lower extremities or feet 32, 33 constituting independent base members for impaling in the ground, the front foot 32 being integral with and horizontally offset from the body of its rack and the rear foot 33 swiveled to the rack body on a pin 34. The horizontal base offsets, together with the standards 13, constitute a pair of grill supports, as will be evident. A double grill or broiler 21, which is shown partly opened in Fig. 3, is provided with a rear hook-supported trunnion rod 26 having a stop button 31 for retaining it permanently in association with the rear rack. At the front, said grill is provided with a square hook-supported handle rod 27 slidable under the grill body and having handle and stop pins 28, 29. In this case, since the distance apart of the racks is not fixed when they are out of the ground, the handle end of the rod 27 is provided with a stop flange or button 31ᵃ to retain said rod permanently in association with the front rack. The lowermost hook 20 of the front rack is shown with an inclined rectangular notch 20ᵃ for holding the broiler with its plane in an inclined position to cook steaks to a greater extent at one edge than at the other so that rare and well-done portions may be provided in the same steak. The swiveling of the rear standard foot 33 permits the broiler to be swung aside from over the fire on pulling up the front standard and reimpaling it in the ground in the new position.

In this form of the invention, the upper ends of the racks 13 are provided with portions 35 bent toward each other at right angles and the slots 19 are extended into these bent portions. This permits the apparatus to be collapsed by folding the front and rear racks 13 respectively over and under the grill, after turning one of them on its rod, while the grill is shortened by sliding its handle rod 27 inwardly, for convenient transportation, as indicated in Fig. 4.

Fig. 5 shows a modified foot structure for the form of invention illustrated in Figs. 3 and 4, consisting of bowed metal strips one of which is adapted to turn upon a pin 34 upon the rack 13 to provide legs 36 in two planes for supporting the apparatus on rocky or hard ground.

The form of the invention illustrated in Fig. 6 resembles that shown in Figs. 1 and 2, except that the fire box 10 is provided with base legs 37 and a grate bottom 38, the rack standards 13, straight throughout, are permanently fastened at their lower ends upon the end walls of the fire box in upright positions instead of being hinged, and a single instead of a double grill or broiler 21ᵃ is employed (although a double one could be used) said grill having fixed thereto at its front end a short, squared rod 27 with a handle 27ᵃ shaped and sized so that it connot pass through the slot 19, and having its rear supporting rod 26 permanently associated with the rear racks by means of the retaining button 31 which prevents the grill from being stolen. The fire-box ends and the standards 13 together constitute a pair of fixed grill supports on the base formed by the legs 37 and their connecting fire-box structure. Cooking vessels are shown supported on the shelf or stove top 12. A cooker of this form is adapted for permanent installation at recreation grounds or for commercial use.

It will be understood that various other modifications could be made without departing from the scope of my invention as defined in the claims.

I claim:

1. A collapsible cooking apparatus comprising a pair of racks each having a corresponding laterally bent end portion, a closed longitudinal slot terminating in said bent portion, and a corresponding series of vertically spaced notches formed in a side wall of said slot, and a grill having a supporting stem at each end extending through said slots and being movable longitudinally thereof whereby said grill may be vertically adjusted on said racks and when said stems are in said bent portions the racks may be folded upon said grill, the grill stems having means coacting with the racks for maintaining said racks and grill permanently associated.

2. Cooking apparatus according to claim 1 in which the racks are bent at their upper ends and provided with supporting feet at their lower ends.

3. Apparatus according to claim 1 in which one of the stems is longitudinally slidable on the grill to reduce the length of the grill and stem structure in the folded condition.

4. Cooking apparatus comprising a grill having opposite stems provided with rack-retaining stops, a pair of racks having means coacting with said stops to maintain said racks permanently assembled with the grill and foldable over the grill to collapse the apparatus, said means comprising inwardly offset upper ends and a closed longitudinal slot extending into each of said ends, means for supporting said grill at different vertical adjustments comprising a series of vertically-spaced, stem-holding notches in each slot, and respective ground-engaging independent base members at the lower ends of said standards for supporting them on the ground in an upright position.

JOSEPH A. H. MYERS.